US010209911B2

(12) United States Patent
Chin et al.

(10) Patent No.: US 10,209,911 B2
(45) Date of Patent: Feb. 19, 2019

(54) TECHNIQUES ENABLING LOW POWER STATES FOR A COMMUNICATIONS PORT

(71) Applicant: INTEL CORPORATION, Santa Clara, CA (US)

(72) Inventors: Jennifer Chin, Sungai Ara (MY); Su Wei Lim, Bayan Lepas (MY); Poh Thiam Teoh, Kuala Lumpur (MY); Ting Lok Song, Bayan Lepas (MY); Sun Zheng E, Balik Pulau (MY); Say Cheong Gan, Bukit Mertajam (MY)

(73) Assignee: INTEL CORPORATION, Santa Clara, CA (US)

(*) Notice: Subject to any disclaimer, the term of this patent is extended or adjusted under 35 U.S.C. 154(b) by 86 days.

(21) Appl. No.: 15/024,717

(22) PCT Filed: Sep. 16, 2014

(86) PCT No.: PCT/US2014/055768
§ 371 (c)(1),
(2) Date: Mar. 24, 2016

(87) PCT Pub. No.: WO2015/047782
PCT Pub. Date: Apr. 2, 2015

(65) Prior Publication Data
US 2016/0231958 A1   Aug. 11, 2016

(30) Foreign Application Priority Data
Sep. 27, 2013 (MY) .......................... PI 2013003512

(51) Int. Cl.
G06F 1/32 (2006.01)
G06F 3/06 (2006.01)

(52) U.S. Cl.
CPC .......... *G06F 3/0625* (2013.01); *G06F 1/3237* (2013.01); *G06F 1/3278* (2013.01);
(Continued)

(58) Field of Classification Search
CPC .... G06F 1/3237; G06F 1/3278; G06F 1/3287; G06F 3/061; G06F 3/0634
See application file for complete search history.

(56) References Cited

U.S. PATENT DOCUMENTS 7,188,263 B1    3/2007  Rubinstein et al.
2005/0262368 A1* 11/2005 Cherukuri ............. G06F 1/3209
                                                      713/324
(Continued)

FOREIGN PATENT DOCUMENTS

WO   2013006535 A1   1/2013

OTHER PUBLICATIONS

International Search Report in International Patent Application No. PCT/US2014/055768 dated Dec. 22, 2014.
(Continued)

*Primary Examiner* — Jaweed A Abbaszadeh
*Assistant Examiner* — Gayathri Sampath

(57) ABSTRACT

Various embodiments are generally directed to an apparatus, method and other techniques for determining when a communications port is in a first low power state, determining that a coupled device entered a low power state and enabling a second low power state based on the determination that the device has entered the low power state, the second low power state to use less power than the first low power state.

21 Claims, 7 Drawing Sheets

(52) U.S. Cl.
CPC ............ *G06F 1/3287* (2013.01); *G06F 3/061* (2013.01); *G06F 3/0634* (2013.01); *G06F 3/0653* (2013.01); *G06F 3/0673* (2013.01); *Y02D 10/128* (2018.01); *Y02D 10/157* (2018.01); *Y02D 10/171* (2018.01)

(56) References Cited

U.S. PATENT DOCUMENTS

| | | | |
|---|---|---|---|
| 2007/0242300 A1 | 10/2007 | Inai | |
| 2008/0288798 A1* | 11/2008 | Cooper | G06F 1/3228 713/322 |
| 2009/0077395 A1 | 3/2009 | Tsai | |
| 2009/0327773 A1* | 12/2009 | Huffman | G06F 1/3203 713/320 |
| 2012/0124252 A1 | 5/2012 | Kayama | |
| 2012/0324265 A1 | 12/2012 | Jeyaseelan et al. | |
| 2013/0007483 A1 | 1/2013 | Diefenbaugh et al. | |
| 2013/0132755 A1 | 5/2013 | Cooper et al. | |

OTHER PUBLICATIONS

Office Action received for Chinese Patent Application No. 201480047573.8, dated Sep. 25, 2017, 12 pages.

* cited by examiner

500

DETERMINE WHEN A COMMUNICATIONS PORT IS IN A FIRST LOW POWER STATE
502

DETERMINE WHEN A COUPLED DEVICE ENTERS A LOW POWER STATE
504

ENABLE A SECOND LOW POWER STATE BASED ON THE DETERMINATION THAT THE DEVICE IS ENTERING THE LOW POWER STATE
506

*FIG. 5*

TECHNIQUES ENABLING LOW POWER STATES FOR A COMMUNICATIONS PORT

TECHNICAL FIELD

Embodiments described herein generally relate to low power states for communications ports. In particular, various embodiments are directed to enabling one or more low power states for a communications port for power savings.

BACKGROUND

High speed serial communication links are often used in a platform to provide fast data access. However, these high speed serial communication links often require high idle power. In power sensitive platforms such as handheld and tablet computers, high speed serial communication links may not be suitable due to the high idle power requirements.

BRIEF DESCRIPTION OF THE DRAWINGS

FIG. 5 illustrates an embodiment of a third logic flow diagram.

DETAILED DESCRIPTION

Figure 1:
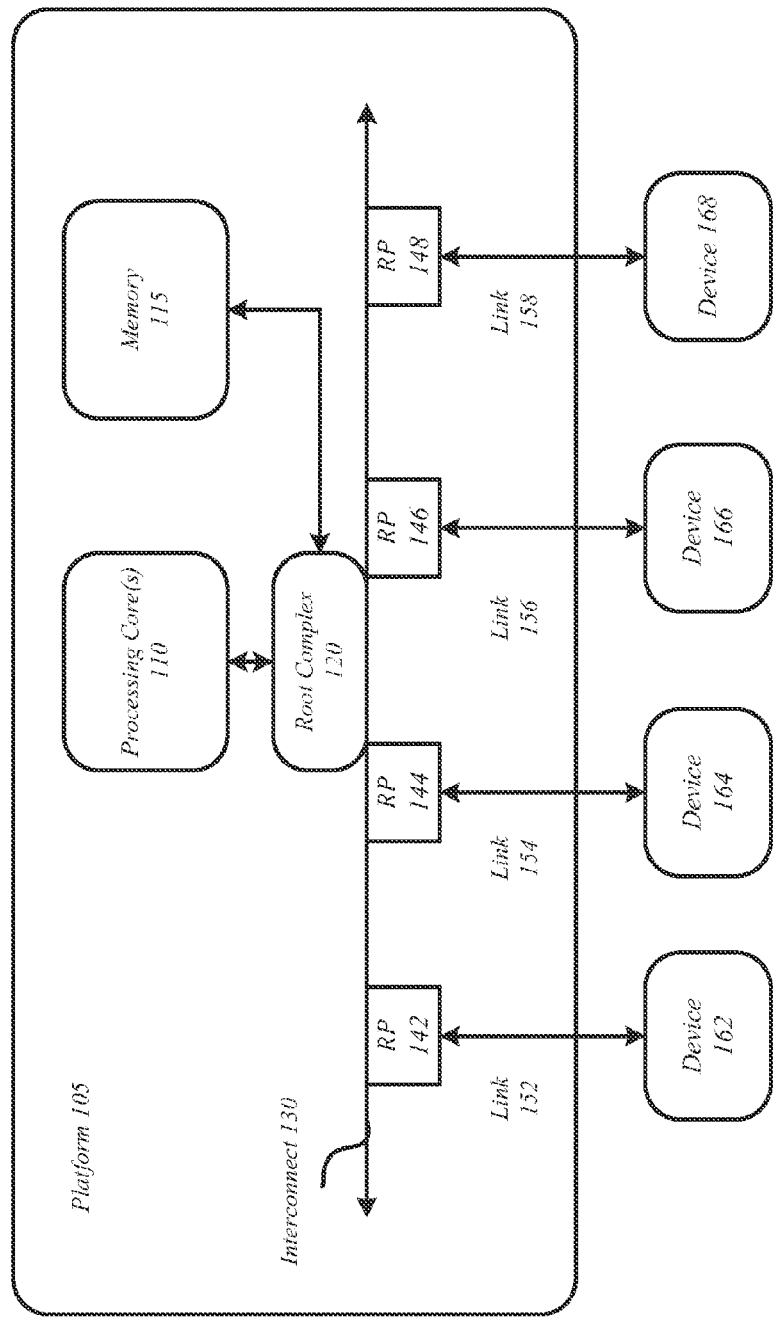
FIG. 1 illustrates an embodiment of a first platform system diagram.

Various embodiments are generally directed to an apparatus, method and other techniques for managing power states for one or more communications ports of an electronic device. Some embodiments are particularly directed to techniques for enabling lower power states for one or more communications ports used for high-speed serial communications, such as a root port or upstream port on a Peripheral Component Interconnect (PCI) Express platform. While described herein as relating to one or more communications ports such as a root port or upstream port on a PCI Express platform, it should be understood that various embodiments are not limited in this manner and the following discussion may apply to other communication interfaces including, but not limited to, Universal Serial Bus (USB) and IEEE 1394 interface technologies, among others.

In some embodiments, the communications port may be included in a host device or platform device and may be used to communicate with another coupled device such as a PCI Express (PCIe) device. The communications port may be used to send and receive information over a communications link with the coupled device. In various embodiments, the communications port may be put into a lower power state of a given power management scheme, such as a L1 low power state where various hardware circuitries may be disabled or power gated. The L1 low power state may be initiated by either hardware-based active state power management or by a received request for the link to enter the L1 low power state. When the communications port is in the L1 low power state transceiver circuitry is shutdown, PCI Express architecture logic is clock gated, and the phase-looked loops (PLLs) are shut down. However other circuitry may remain enabled, such as squelch controller circuitry and analog front end circuitry.

The communications port may also enter a second low power state such as L1.low1 where additional circuitry such as the squelch controller circuitry may be disabled and additional power savings may be achieved. For example, the communications port may be put into the L1.low1 low power state when the coupled device is determined to be in a low power state. In various embodiments, the communications port may include logic to determine that the coupled device is in the low power state based on a de-assertion of a clock request (CLKREQ#) signal. The clock request signal is uni-directional and fully controlled by device.

In another or the same embodiments, the communications port may be put into third low power state such as L1.low2 that uses less power than the L1 and L1.low1 low power states. In L1.low2 power state, analog front end circuitry of the communications port may be power gated to achieve additional power savings. The analog front end may provide the physical link interface to the communication link(s). The analog front end circuitry may also include detection logic to automatically identify and select supported communication protocols.

In various embodiments, the communications port may receive latency tolerance requirements for the coupled device via a latency tolerance report (LTR). The analog front end circuitry may be power gated if the latency tolerance requirement for the coupled device is greater than a power gating exit latency threshold for the analog front end circuitry. The power gating exit latency threshold may be based on an amount of time for the analog front end to exit from a power gating state.

In some embodiments, the communications port may only be put into the L1.low2 low power state when the clock request signal indicates that the coupled device is in a low power state, the squelch controller circuitry is disabled and the latency tolerance requirement is greater than the power gating exiting latency threshold. However, various embodiments are not limited in this manner and the communications port may be put to L1.low2 even if the coupled device is not in a low power state and/or the squelch controller circuitry is not disabled.

Additional power savings may be achieved over the L1 low power state by putting the communications port into the L1.low1 and/or L1.low2 power state. For example, the communications port may reduce power consumption to as low as 90 µW when in the L1.low2 power state compared to 25 mW when in the active state and 10 mW when in idle state for in L1 low power state. Further, the logic to enable the various low power states may be implemented in a hardware autonomous manner and does not require any software intervention. However, in some or other embodiments the logic may be implemented in both hardware and software.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates system diagram 100 of a platform system 105 in accordance with various embodiments described herein. In various embodiments, the platform system 105 comprises processor core(s) 110, Memory 115, root complex 120 and four root ports 142, 144, 146 and 148. The four root ports 142, 144, 146 and 148 may comprise any suitable communications port or interface and are connected to the root complex via interconnect 130. In addition, root port 142 is coupled with device 162 via communications link 152, root port 144 is coupled with device 164 via communications link 154, root port 146 is coupled with and device 166 via communications link 156 and root port 148 is coupled with device 168 via communications link 158. In some embodiments, devices 162, 164, 166 and 168 may comprise PCI Express (PCIe) endpoint devices and each of the root ports 142, 144, 146 and 148 may comprise an upstream port that is coupled with the respective downstream port of the PCIe endpoint devices 162, 164, 164 and 168.

Although FIG. 1 illustrates an embodiment with only four root ports connected with four devices via four communications links, platform system 105 may have any number of root ports connected with any number of devices. For example, platform system 105 may have more than four root ports or less than four root ports.

In some embodiments, the processor core(s) 110 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit.

Memory 115 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 115 can store data momentarily, temporarily, or permanently. The memory 115 stores instructions and data for platform system 105. The memory 115 may also store temporary variables or other intermediate information while processor core(s) 110 are executing instructions. The memory 115 is not limited to storing the above discussed data; the memory 115 may store any type of data.

In various embodiments, system platform may include a root complex 120 to connect the processor core(s) 110 and memory 115 to the PCI Express (PCIe) switch fabric composed of one or more switch devices. The root complex 120 connects the CPU and memory subsystem to the PCI Express fabric. It may support several PCI Express ports, and in this exemplary embodiment shows four root ports. Each port is connected to an endpoint device or else to a switch that then forms a subhierarchy. The root complex generates transaction requests on behalf of the CPU. In response to CPU commands, it generates configuration, memory and IO requests as well as locked transaction requests on the PCI Express fabric. The root complex transmits packets out of its ports and also receives packets into its ports which it then forwards to memory or the CPU. A multi-port root complex may also optionally route packets from one port to another port (supporting peer-to-peer transactions).

In some embodiments, each of the root ports 142, 144, 146 and 148 and their respective PCIe endpoint devices 162, 164, 166 and 168 support one or more low power states such as a L1, L1.low1 and L1.low2 that allows disabling of various high speed circuitries based on the low power state the ports and devices are in. Each of the root ports 142, 144, 146 and 148 and their respective PCIe endpoint devices 162, 164, 166 and 168 can initiate an entry or transition to a low power state by sending an indication or information in one or more embodiments described herein.

For example, the L1 low power state may be initiated by either hardware-based active state power management or by requesting the link to enter L1 after the operating system places the downstream device such as devices 162, 164, 166 and 168 in device low power states D1-D3. The L1 low power state is a low exit latency link state that is intended to reduce power when the device becomes aware of a lack of outstanding requests or pending transactions. When the root ports are in the L1 low power state most of the transceiver circuitry is shutdown, most PCI Express architecture logic is clock gated, and most of the phase-looked loops (PLLs) are shutdown. However, squelch controller circuitry and analog front end circuitry may remain enabled in the L1 low power state.

In addition to the L1 low power state discussed above, various embodiments include lower power states L1.low1 and L1.low2. In the L1.low1 the squelch controller circuitry is fully turned off or disabled in addition to all of the hardware and circuitry shutdown, disabled or power gated in the L1 state. The squelch controller circuitry may be used to detect signals or information received from a coupled device or endpoint. More specifically, the squelch controller circuitry provides an input signal power level monitoring function to identify if there is a valid signal or information received from endpoint.

In the L1.low1 power state significant power savings may be achieved over the L1 power state by shutting off the squelch controller circuitry. However, the root port in the L1.low1 power state will lose the ability to detect any wake event on the link with the endpoint. The L1.low1 power state may be entered when a clock request signal (CLKREQ#) in a uni-directional pin is de-asserted indicating the coupled device is transitioning or is in a low power state. In some embodiments, opposite logic may exist where the CLKREQ# is asserted to indicate that the coupled device is transitioning or is in the low power state.

In the L1.low2 power state, in addition to the hardware and circuitry shutoff in the L1 and the L1.low1 power state, analog front end (AFE) circuitry of the root port is power gated to achieve even more power savings by preventing dynamic and leakage current. To power gate the AFE, current to the circuit may be shutoff In various embodiments, a root port may enter the L1.low2 power state when the platform uni-directional CLKREQ# pin is de-asserted, the squelch controller circuitry is disabled and a latency tolerance report from the coupled device is greater than a power gating exit latency threshold.

In various embodiments, both the root ports and the endpoint device support Latency Tolerance Reporting (LTR). For example, the root port in an upstream port receives a LTR message from the endpoint device and the endpoint device receives a LTR message from the root port in an upstream port. The LTR message includes, but is not limited to, the service latency requirement or latency tolerance of the up/downstream port. In various embodiments, the root port may use the last received service latency requirement from the endpoint device when determining if the latency tolerance of the endpoint device is greater than the power gating exit latency threshold.

In various embodiments, the power gating exit latency tolerance threshold may be set to an amount of time for the AFE to exit from being power gated. Thus, if the latency tolerance received in the LTR from the endpoint device is greater than the power gating exit latency tolerance threshold, the AFE may be safely power gated because the AFE will have a sufficient amount of time to exit from power gating without causing adverse effects for the coupled endpoint device due to the endpoint device latency tolerance requirement.

The components illustrated in the platform system 105 are not meant to be limiting and are presented for purposes of illustration. In other embodiments, the configuration of the platform system 105 includes other (more or less) components than shown in FIG. 1. One of ordinary skill in the relevant art will appreciate that other configurations of the platform system 105 can be used without affecting the workings of the embodiments described herein.

Figure 2:
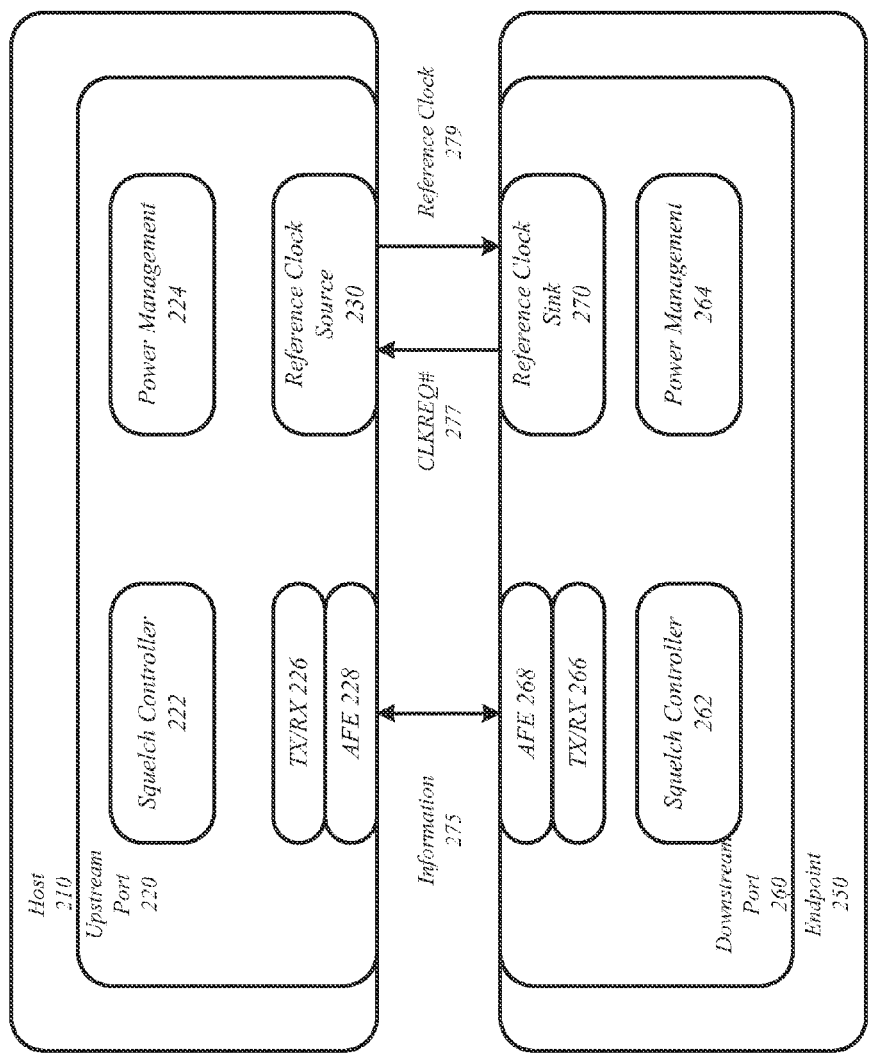
FIG. 2 illustrates an embodiment of a host device and an end point device.

FIG. 2 illustrates an embodiment of a host device 210 and an endpoint device 250. In various embodiments, the host device 110 may include the components of platform system 105 and the endpoint device 250 may be any one of devices 162, 164, 166 and 168. Host device 210 may include an upstream port 220 having squelch controller circuitry 222, power management logic 224, transceiver circuitry 226, analog front end circuitry 228 and reference clock source 230. In various embodiments, the upstream port 220 may be similar or the same as any one of root ports 142, 144, 146 and 148.

The squelch controller circuitry 222 may be utilized by the platform system 105 and/or host 210 to detect signals or information received from the coupled device or endpoint 250. More specifically, the squelch controller circuitry 222 provides an input signal power level monitoring function to identify if there is a valid signal or information received from endpoint 250. Although shown separately, the squelch controller circuitry 222 may be part of or incorporated in the transceiver circuitry 226.

In some embodiments, the squelch controller circuitry 222 may be disabled or powered down based on an indication that the endpoint 250 is entering a low power state based on the CLKREQ# signal being de-asserted. By disabling the squelch controller circuitry 222 significant power savings may be achieved because the squelch controller circuitry is not enabled and is not continuously monitoring for a valid signal or information.

The upstream port 220 may also include power management logic 224 to control various low power states such as L1, L1.low1 and L1.low2 for the root port or upstream port 220. The power management logic 224 may be implemented in any hardware, software or circuitry including processor core(s) 110 and/or controller such as a PCI Express controller (not shown). In various embodiments, the power management logic 224 may be implemented in hardware only and may be hardware autonomous not requiring any software intervention. However, in other embodiments, the power management logic 224 may be implemented in both hardware and software.

In some embodiments, the power management logic 224 may detect a de-assertion of the CLKREQ# signal from the endpoint 250 on a uni-directional communication link. The power management logic 224 may disable the squelch circuitry, as described above, based on the detection of the de-assertion of the CLKREQ# signal. As previously discussed, the de-assertion of the CLKREQ# pin indicates that the coupled endpoint 250 has entered or is transitioning to a low power state. In various embodiments, the power management logic 224 may be configured to also detect an assertion of the CLKREQ# pin indicating that the coupled endpoint 250 has exited the low power state. The power management logic 224 may enable the squelch controller circuitry 222 based on the assertion detection. In some embodiments, this logic may be reversed, and the power management logic 224 may be configured accordingly to disable the squelch controller circuit 222 when the endpoint device 250 is in the low power state and to enable the squelch controller circuit 22 when the endpoint device 250 is not in the low power state.

The power management logic 224 may also power gate the analog front end (AFE) 228 based on a comparison between the latency tolerance report (LTR) of the endpoint 250 and the power gating exit latency threshold for the AFE 228. For example, the power management logic 224 may receive information including the LTR from the endpoint 250 and if the latency tolerance requirement of the endpoint 250 is greater than the power gating exit latency threshold, the power management logic 224 may power gate the AFE 228. If latency tolerance is not greater than the power gating exit latency threshold, the power management logic 224 may not power gate the AFE 228.

In some embodiments, the power management logic 224 may only power gate the AFE if the CLKREQ# pin indicates that the endpoint 250 is in the low power state, the squelch controller circuitry has been disabled and the latency tolerance for the endpoint 250 is greater than the power gating exit latency threshold. By requiring that the endpoint 250 is in the low power state and the squelch controller circuitry is turned off before power gating the AFE 228, the power management circuitry 224 ensures that the endpoint 250 is in the low power state and no wake events will be sent and missed by the AFE 228.

In some embodiments, the upstream port 220 may include transceiver circuitry 226. Although, FIG. 2 illustrates the transceiver circuitry 226 as one device, various embodiments are not limited in this manner and the transmitter and receiver may be separate devices. In various embodiments, the transceiver 226 may communicate information 275 with the endpoint over one or more links or connections.

The upstream port 220 may also include an analog front end (AFE) 228 to provide the physical link interface to the communication link(s). The analog front end circuitry may also include detection logic to automatically identify and select supported communication protocols. Although shown separately, the AFE 228 may be incorporated in or part of the transceiver circuitry 226.

As previously discussed, the AFE 228 may be power gated based on a comparison between a LTR from the endpoint 250 and the power gating exit latency threshold for the AFE 228. The power gating exit latency tolerance threshold may be set to an amount of time for the AFE 228 to exit from being power gated. Thus, if the latency tolerance received in the LTR from the endpoint device is greater than the power gating exit latency tolerance threshold, the AFE 228 may be safely power gated because the AFE 228 will have sufficient amount of time to exit the power gating without causing adverse effects for the coupled endpoint device due to the endpoint device latency tolerance requirement.

In various embodiments, the upstream port 220 may include a reference clock source 230 coupled with the reference clock sink 270 and a uni-directional clock request (CLKREQ#) signal 277 and the reference clock signal 279 may be communicated between the reference clock source 230 and the reference clock sink 270 on uni-directional links. In various embodiments, the clock request signal 227 may be a request for a clock signal from the reference clock sink 270. The uni-directional CLKREQ# may also be used to determine if the endpoint 250 is in a low power state when the CLKREQ# signal 277 de-asserts a pin at the reference clock source 230.

FIG. 2 illustrates endpoint 250 having similar components as found in the host device 210. For example, endpoint 250 may include a downstream port 260 including squelch controller circuitry 262, power management logic 264, transceiver circuitry 266, an analog front end (AFE) 268 and a reference clock sink 270. These components may operate similarly or the same as the corresponding components found in the host device 210.

Figure 3:
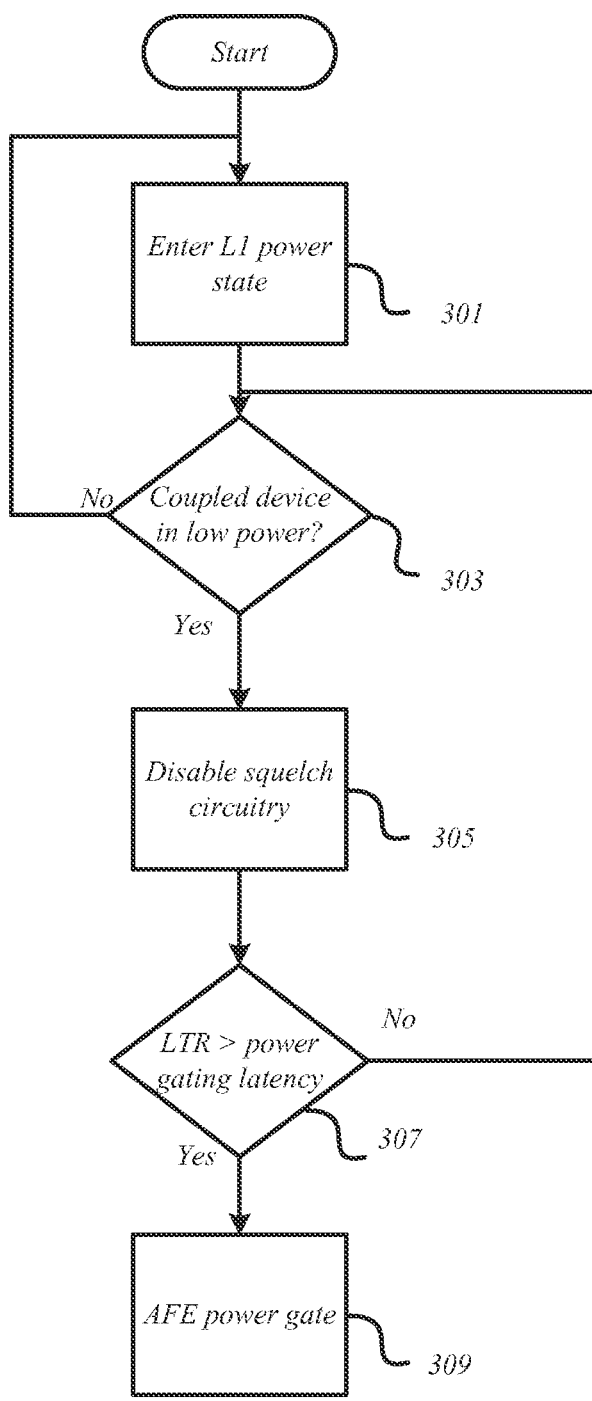
FIG. 3 illustrates an embodiment of a first logic flow diagram.

FIG. 3 illustrates a first logic flow 300 for enabling various low power states including L1, L1.low1 and L1.low2 for a root port or upstream port. In various embodiments, a L1 low power state may be enabled for the root port at block 301. For example, the L1 low power state may be initiated by either hardware-based active state power management or by requesting the link to enter L1 after the operating system places the downstream device low power states D1-D3. When the root port is in the L1 low power state most of the transceiver circuitry is shutdown, most PCI Express architecture logic is clock gated, and most of the phase-looked loops (PLLs) are shutdown.

At decision block 303, a determination is made as to whether a coupled device is in a low power state. In various embodiments, the determination may be made based on whether a clock request (CLKREQ#) pin is de-asserted or asserted, as previously discussed. If the coupled device is in the low power state, squelch controller circuitry is disabled on the root port at block 305 and the root port may enter or be in the L1.low1 power state. However, if the coupled device is not in the low power state, the root port may stay in the L1power state until the coupled device enters a low power state or until an indication is received by the root port to exit the L1 low power state and enter a L0 normal operating state.

In various embodiments, latency tolerance requirement in a latency tolerance report (LTR) from a coupled device may be compared to a power gating exit latency threshold at decision block 307. In various embodiments, the root port may use the last received service latency requirement from the coupled device when determining if the latency tolerance of the device is greater than the power gating exit latency threshold. In various embodiments, the power gating exit latency tolerance threshold may be set to an amount of time for an analog front end (AFE) to exit from being power gated.

If the latency tolerance requirement is greater than the power gating exit latency threshold, the AFE may be power gated at block 309, and the root port may enter L1.low2 low power state. However, if the latency tolerance requirement is not greater than (or equal) the power gating exit latency threshold, the AFE is not power gated and the root port remains in the L1.low1 low power state.

In various embodiments, the root port uses less power when in the L1.low1 low power state than when in the L1 low power state. In addition, the root port uses less power than both the L1.low1 low power state and the L1 low power state when in the L1.low2 low power state.

In some embodiments, the root port may not enter the L1.low2 low power state unless a coupled device is in the low power state, the squelch controller circuitry is disabled and the latency tolerance is greater than then power gating exit latency threshold.

Figure 4:
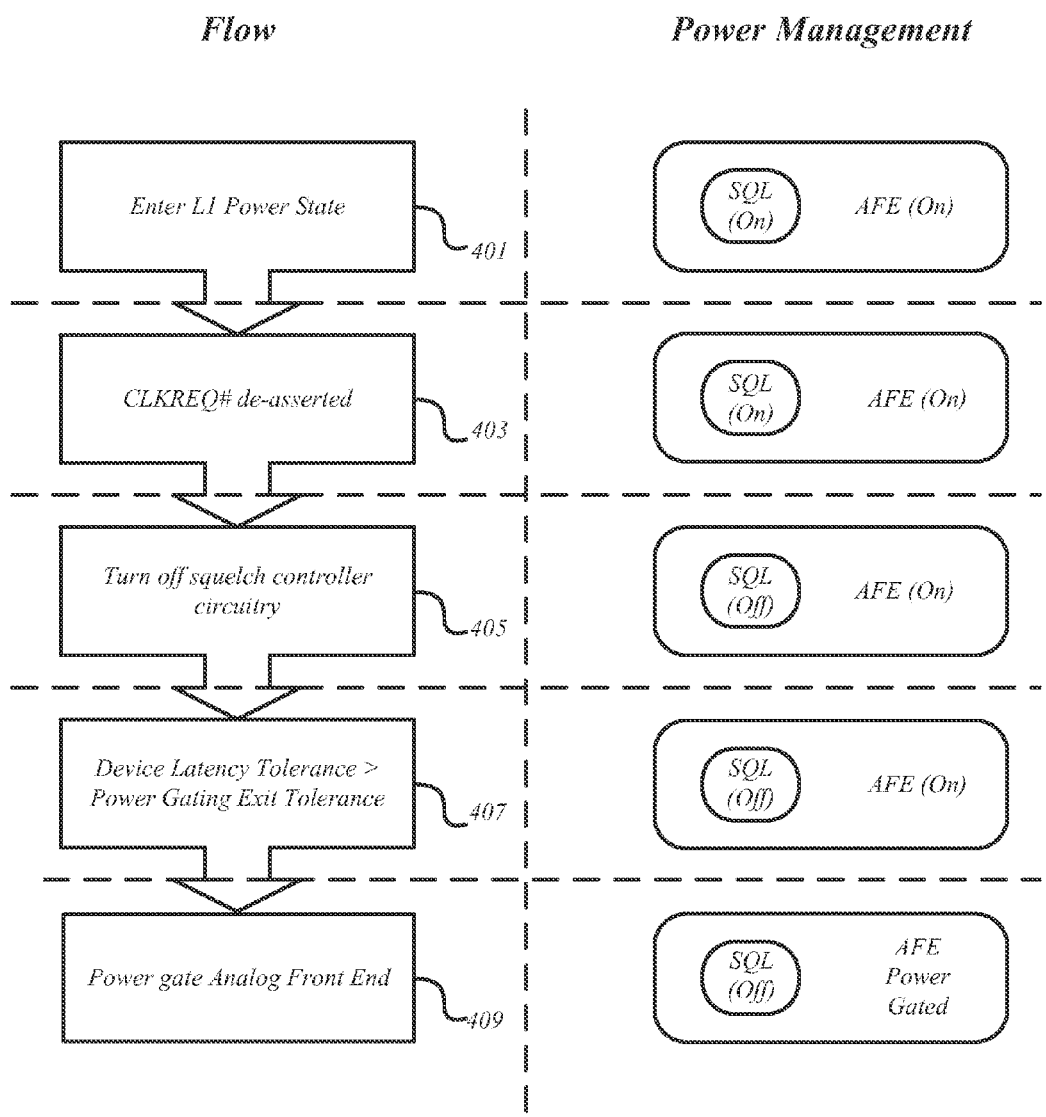
FIG. 4 illustrates an embodiment of a second logic flow diagram and circuitry states.

FIG. 4 illustrates an embodiment of second logic flow diagram 400 and circuitry states for a root port. FIG. 4 will be discussed with reference to FIG. 2 for illustrative purposes and is not limited in this manner. In various embodiments, FIG. 4 illustrates a logic flow on the left side of diagram 400 and the power management logic 224 for controlling the squelch controller circuitry 222 and analog front end circuitry 228 on the right side of the diagram.

At block 401, a root port may enter a low power state such as L1 low power state. When the root port or upstream port 220 is in the L1 low power state most of the transceiver circuitry is shutdown, most PCI Express architecture logic is clock gated, and most of the phase-looked loops (PLLs) are shutdown. However, the squelch controller circuitry 222 and analog front end 228 are enabled or on. At block 403, the CLKREQ# signal is de-asserted indicating that a coupled device is entering or in a low power state. At this point the squelch controller circuitry 222 and AFE 228 are still enabled.

The power management logic 224 may disable or shutoff the squelch controller circuitry 222 at block 405 based on the de-assertion of the CLKREQ# signal. By shutting off the squelch controller circuitry 222 significant power savings may be achieved and the root port may be entered into the L1.low1 power state.

At block 407, the device latency tolerance requirement for a coupled device received in a device latency tolerance report (LTR) may be determined to be greater than a power gating exit tolerance threshold. At this point, the squelch controller circuitry 222 may be off, but the AFE 228 is on. At block 409, the power management logic 224 may power gate the AFE 409 and both the squelch controller circuitry 222 may be off and AFE 228 may be power gated and the root port may be in the L1.low2 low power state.

FIG. 5 illustrates an embodiment in a third logic flow 500. The logic flow 500 may be representative of some or all of the operations executed by one or more embodiments described herein. For example, the logic flow 500 may illustrate operations performed by the platform system 105, host 210 and endpoint 250. In the illustrated embodiment shown in FIG. 5, the logic flow 500 may include determining when a communications port is in a first low power state at block 502. For example, a communications port such as a root port, upstream port or downstream port may be in a first low power state such as L1. The L1 low power state may be initiated by hardware-based active state power management. The L1 low power state is a low exit latency link state that is intended to reduce power when the device becomes aware of a lack of outstanding requests or pending transactions. When the root port is in the L1 low power state most of the transceiver circuitry is shutdown, most PCI Express architecture logic is clock gated, and most of the phase-looked loops (PLLs) are shutdown.

In some embodiments, power management logic 224 may determine if a communications port is in a first low power state or L1 low power state based on which transceiver circuitry is shutdown, which PCI Express architecture logic is clock gated and which PLLs are shutdown. In addition, Power management logic 224 may determine if a communications port is in a first low power state based on received information or the configuration of one or more registers. For example, when the communications port enters the L1 low power state a register may be set indicating that the communications port is in the L1 low power state. The register may be reset upon the communications port exiting the L1 low power state, such as entering normal operating state such as L0.

At block 504, logic flow 500 may include determining when a coupled device enters a low power state. In various embodiments, the communications port may be coupled with a device, such as a PCI Express device and power management logic may determine when the coupled device enters or is in a low power state based on a clock request (CLKREQ#) signal. In some embodiments, the de-assertion of the signal on a connector or pin of the root port and reference clock source 230 may indicate that the coupled device is entering or is in a low power state. By monitoring the uni-directional CLKREQ# signal link to determine if the coupled device enters the low power state, the communications port may make the determination without any PCI Express specification changes.

Logic flow 500 may also include enabling a second low power state based on the determination that the device is entering the low power state at block 506. In various embodiments, when enabling the second low power state, squelch controller circuitry may be disabled. The second low power state may be the L1.low1 low power state and significant power savings may be achieved by turning off the high frequency squelch controller circuitry.

Figure 6:
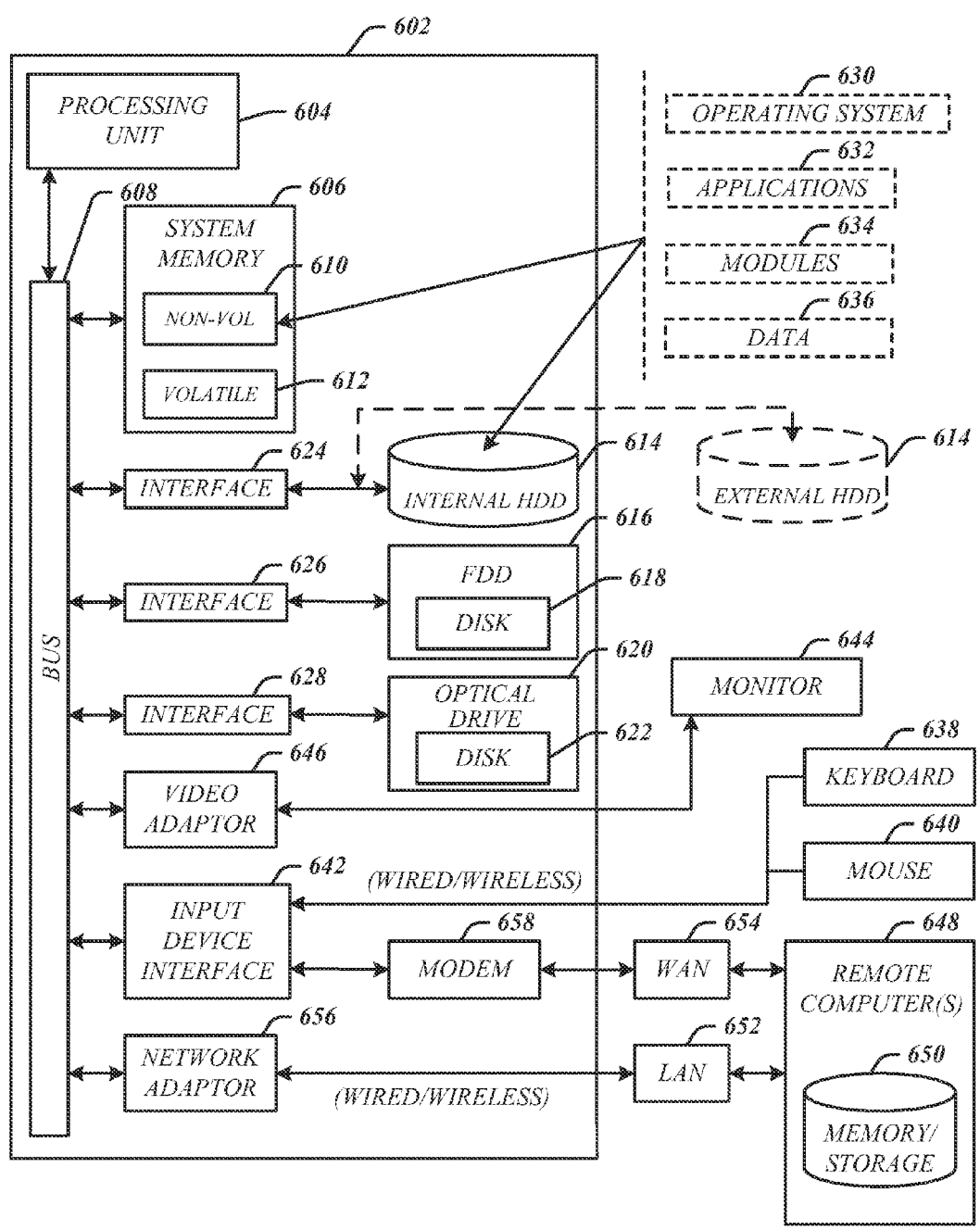
FIG. 6 illustrates an embodiment of a computing architecture.

FIG. 6 illustrates an embodiment of an exemplary computing architecture 600 suitable for implementing various embodiments as previously described. In one embodiment, the computing architecture 600 may comprise or be implemented as part of or computing device 115.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, such as those described with reference to the platform processing device 110 shown in FIG. 1.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the platform system 105 as previously described with reference to FIGS. 1-6 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
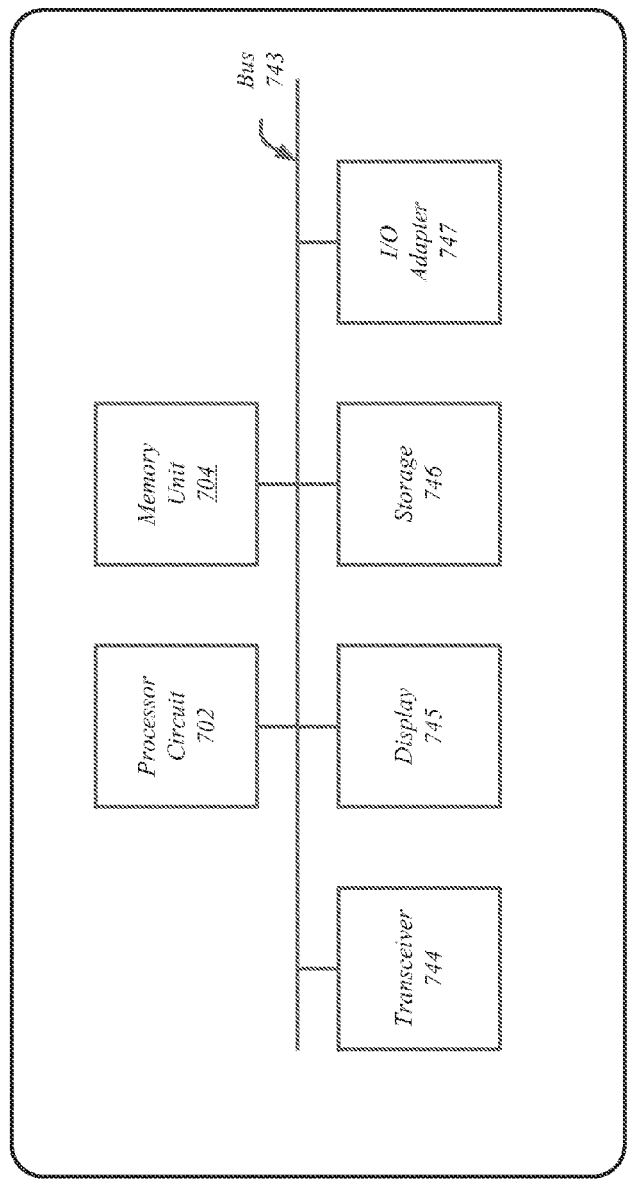
FIG. 7 illustrates an embodiment of a second system diagram.

FIG. 7 illustrates one embodiment of a system 700. In various embodiments, system 700 may be representative of a system or architecture suitable for use with one or more embodiments described herein, such as system 105 of FIG. 1, host 210 and endpoint 250 of FIG. 2, logic flow 300 of FIG. 3, logic flow 400 of FIG. 4 and logic flow 500 of FIG. 5. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In various embodiments, system 700 may include a processor circuit 702. Processor circuit 702 may be implemented using any processor or logic device, and may be the same as or similar to processor circuit 102 of FIG. 1.

In one embodiment, system 700 may include a memory unit 704 to couple to processor circuit 702. Memory unit 704 may be coupled to processor circuit 702 via communications bus 743, or by a dedicated communications bus between processor circuit 702 and memory unit 704, as desired for a given implementation. Memory unit 704 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 700 may include a transceiver 744. Transceiver 744 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 744 may operate in accordance with one or more applicable standards in any version. The embodiments are not limited in this context.

In various embodiments, system 700 may include a display 745. Display 745 may constitute any display device capable of displaying information received from processor circuit 702, and may be the same as or similar to display 142 of FIG. 1.

In various embodiments, system 700 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 700 may include one or more I/O adapters 747. Examples of I/O adapters 747 may include Universal Serial Bus (USB) ports/adapters, IEEE 1394 Firewire ports/adapters, and so forth. The embodiments are not limited in this context.

The detailed disclosure now turns to providing examples that pertain to further embodiments. Examples one through thirty-two (1-32) provided below are intended to be exemplary and non-limiting.

In a first example, an apparatus or computing device may include processor circuitry and power management logic or controller for execution on the processor circuitry to determine when a communications port of the apparatus is in a first low power state, to determine that a device coupled to the communications port entered a low power state, and to enable a second low power state for the communications port based on the determination that the device entered the low power state, the second low power state to use less power than the first low power state.

In a second example and in furtherance of the first example, an apparatus ro computing device may include power management logic or a controller to determine that a latency tolerance requirement of the device is greater than a power gating exit latency threshold, and to enable a third low power state for the communications port based on the determination.

In a third example and in furtherance of any of the previous examples, wherein the third low power state to use less power than both the second low power state and the first low power state.

In a fourth example and in furtherance of any of the previous examples, an apparatus or computing device may include power management logic or a controller to determine that the coupled device entered the low power state comprising detecting a de-assertion of a clock request signal and to disable squelch controller circuitry upon the detection of the de-assertion of the clock request signal.

In a fifth example and in furtherance of any of the previous examples, an apparatus or computing device may include power management logic or a controller to enable second low power state for the communications port when the squelch controller circuitry is disabled.

In a sixth example and in furtherance of any of the previous examples, an apparatus or computing device may include power management logic or a controller to determine when the latency tolerance requirement of the device is greater than the power gating exit latency threshold based on a received latency tolerance report from the coupled device and to power gate an analog front end circuitry when the latency tolerance requirement is greater than the power gating exit latency threshold.

In a seventh example and in furtherance of any of the previous examples, an apparatus or a computing device may include power management logic or a controller to power gate the analog front end circuitry when the latency tolerance requirement is greater than the power gating exit latency threshold, a clock request signal is de-asserted and squelch controller circuitry is disabled.

In an eightieth example and in furtherance of any of the previous examples, an apparatus or computing device may include power management logic or a controller to enable the third low power state for the communications port is enabled when the analog front end circuitry is power gated.

In a ninth example and in furtherance of any of the previous examples, an article comprising a computer-readable storage medium containing a plurality of instructions that when executed enable a processor circuit to determine when a communications port is in a first low power state, determine that a coupled device entered a low power state and enable a second low power state based on the determination that the device is entering the low power state, the second low power state uses less power than the first low power state.

In a tenth example and in furtherance of any of the previous examples, an article comprising instructions that when executed enable the processing circuit to determine that a latency tolerance requirement of the device is greater than a power gating exit latency threshold, and to enable a third low power state based on the determination.

In a eleventh example and in furtherance of any of the previous examples, an article wherein the third low power state uses less power than both the second low power state and the first low power state.

In a twelfth example and in furtherance of any of the previous examples, an article comprising instructions to detect a de-assertion of a clock request signal to determine when the device is entering the low power state and to disable the squelch controller circuitry upon the detection of the de-assertion of the clock request signal.

In a thirteenth example and in furtherance of any of the previous examples, an article comprising instructions to enable the second low power state when the squelch controller circuitry is disabled.

In a fourteenth example and in furtherance of any of the previous examples, an article comprising instructions determine that a latency tolerance requirement of the device is greater than the power gating exit latency threshold based on a received latency tolerance report and power gate analog front end circuitry when the latency tolerance requirement is greater than the power gating exit latency threshold.

In a fifteenth example and in furtherance of any of the previous examples, an article comprising instructions to power gate analog front end circuitry when a latency tolerance requirement is greater than a power gating exit latency threshold, a clock request signal is de-asserted and squelch circuitry is disabled.

In a sixteenth example and in furtherance of any of the previous examples, an article comprising instructions to enable the third low power state when the analog front end circuitry is power gated.

In a seventeenth example and in furtherance of any of the previous examples, a computer-implemented method may include determining when a communications port is in a first low power state, determining that a coupled device entered a low power state and enabling a second low power state based on the determination that the device has entered the low power state, the second low power state uses less power than the first low power state.

In an eighteenth example and in furtherance of any of the previous examples, a computer-implemented method may include determining that a latency tolerance requirement of the device is greater than a power gating exit latency threshold, and to enable a third low power state based on the determination.

In a nineteenth example and in furtherance of any of the previous examples, a computer-implemented method wherein the third low power state uses less power than both the second low power state and the first low power state.

In a twentieth example and in furtherance of any of the previous examples, a computer-implemented method may include detecting a de-assertion of a clock request signal to determine when the device is entering the low power state and disabling the squelch controller circuitry upon the detection of the de-assertion of the clock request signal.

In a twenty-first example and in furtherance of any of the previous examples, a computer-implemented method may include enabling the second low power state when the squelch controller circuitry is disabled.

In a twenty-second example and in furtherance of any of the previous examples, a computer-implemented method may include determining that a latency tolerance requirement of the device is greater than the power gating exit latency threshold based on a received latency tolerance report and power gating analog front end circuitry when the latency tolerance is greater than the power gating exit latency threshold.

In a twenty-third example and in furtherance of any of the previous examples, a computer-implemented method may include power gating analog front end circuitry when a latency tolerance requirement is greater than a power gating exit latency threshold, a clock request signal is de-asserted and squelch circuitry is disabled.

In a twenty-fourth example and in furtherance of any of the previous examples, a computer-implemented method may include enabling the third low power state when the analog front end circuitry is power gated.

In a twenty-fifth example and in furtherance of any of the previous examples, an apparatus man include means for determining when a communications port is in a first low power state, means for determining that a coupled device entered a low power state; and, means for enabling a second low power state based on the determination that the device has entered the low power state, the second low power state to use less power than the first low power state.

In a twenty-sixth example and in furtherance of any of the previous examples, an apparatus may include means for determining that a latency tolerance requirement of the device is greater than a power gating exit latency threshold, and to enable a third low power state based on the determination.

In a twenty-seventh example, the third low power state to use less power than both the second low power state and the first low power state.

In a twenty-eighth example and in furtherance of any of the previous examples, an apparatus may include means for detecting a de-assertion of a clock request signal to determine when the device is entering the low power state and means for disabling the squelch controller circuitry upon the detection of the de-assertion of the clock request signal.

In a twenty-ninth example and in furtherance of any of the previous examples, an apparatus may include means for enabling the second low power state when the squelch controller circuitry is disabled.

In a thirtieth example and in furtherance of any of the previous examples, an apparatus may include means for determining that a latency tolerance requirement of the device is greater than the power gating exit latency threshold based on a received latency tolerance report and means for power gating analog front end circuitry when the latency tolerance is greater than the power gating exit latency threshold.

In a thirty-first example and in furtherance of any of the previous examples, an apparatus may include means for power gating analog front end circuitry when a latency tolerance requirement is greater than a power gating exit latency threshold, a clock request signal is de-asserted and squelch circuitry is disabled.

In a thirty-second example and in furtherance of any of the previous examples, an apparatus may include means for enabling the third low power state when the analog front end circuitry is power gated.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   processor circuitry; and
   power management logic for execution on the processor circuitry to determine when a communications port of the apparatus is in a first low power state, determine that a device coupled to the communications port entered a low power state based on detection of a de-assertion of a clock request signal on a uni-directional clock request signal link from the device to the communications port, disable squelch controller circuitry based upon detection of the de-assertion of the clock request signal, and enable a second low power state for the communications port based on the determination that the device entered the low power state, the second low power state to use less power than the first low power state.

2. The apparatus of claim 1, the power management logic to determine that a latency tolerance requirement of the device is greater than a power gating exit latency threshold, and to enable a third low power state for the communications port based on the determination.

3. The apparatus of claim 2, the third low power state to use less power than both the second low power state and the first low power state.

4. The apparatus of claim 1, the power management logic to enable second low power state for the communications port when the squelch controller circuitry is disabled.

5. The apparatus of claim 2, the power management logic to determine when the latency tolerance requirement of the device is greater than the power gating exit latency threshold based on a received latency tolerance report from the coupled device and power gate an analog front end circuitry when the latency tolerance requirement is greater than the power gating exit latency threshold.

6. The apparatus of claim 5, the power management logic to power gate the analog front end circuitry when the latency tolerance requirement is greater than the power gating exit latency threshold, the clock request signal on the uni-directional clock request signal link is de-asserted and squelch controller circuitry is disabled.

7. The apparatus of claim 5, the power management logic to enable the third low power state for the communications port is enabled when the analog front end circuitry is power gated.

8. An article comprising a non-transitory computer-readable storage medium containing a plurality of instructions that when executed enable a processor circuit to:
   determine when a communications port is in a first low power state;

determine that a coupled device entered a low power state based on detection of a de-assertion of a clock request signal on a uni-directional clock request signal link from the coupled device to the communication port;

disable squelch controller circuitry based upon detection of the de-assertion of the clock request signal; and enable a second low power state based on the determination that the device is entering the low power state, the second low power state to use less power than the first low power state.

9. The article of claim 8, comprising instructions that when executed enable the processing circuit to determine that a latency tolerance requirement of the device is greater than a power gating exit latency threshold, and to enable a third low power state based on the determination.

10. The article of claim 9, the third low power state to use less power than both the second low power state and the first low power state.

11. The article of claim 8, comprising instructions that when executed enable the processing circuit to enable the second low power state when the squelch controller circuitry is disabled.

12. The article of claim 8, comprising instructions that when executed enable the processing circuit to:

determine that a latency tolerance requirement of the device is greater than the power gating exit latency threshold based on a received latency tolerance report; and power gate analog front end circuitry when the latency tolerance requirement is greater than the power gating exit latency threshold.

13. The article of claim 8, comprising instructions that when executed enable the processing circuit to power gate analog front end circuitry when a latency tolerance requirement is greater than a power gating exit latency threshold, the clock request signal on the uni-directional clock request signal link is de-asserted and squelch circuitry is disabled.

14. The article of claim 13, comprising instructions that when executed enable the processing circuit to enable a third low power state when the analog front end circuitry is power gated.

15. A computer-implemented method, comprising:

determining when a communications port is in a first low power state;

determining that a coupled device entered a low power state based on detection of a de-assertion of a clock request signal on a uni-directional clock request signal link from the coupled device to the communication port;

disabling squelch controller circuitry based upon detection of the de-assertion of the clock request signal; and enabling a second low power state based on the determination that the device has entered the low power state, the second low power state to use less power than the first low power state.

16. The computer-implemented method of claim 15, comprising:

determining that a latency tolerance requirement of the device is greater than a power gating exit latency threshold, and to enable a third low power state based on the determination.

17. The computer-implemented method of claim 16, the third low power state to use less power than both the second low power state and the first low power state.

18. The computer: implemented method of claim 15, comprising enabling the second low power state when the squelch controller circuitry is disabled.

19. The computer-implemented method of claim 15, comprising:

determining that a latency tolerance requirement of the device is greater than the power gating exit latency threshold based on a received latency tolerance report; and power gating analog front end circuitry when the latency tolerance is greater than the power gating exit latency threshold.

20. The computer-implemented method of claim 15, comprising:

power gating analog front end circuitry when a latency tolerance requirement is greater than a power gating exit latency threshold, the clock request signal on the uni-directional clock request signal link is de-asserted and squelch circuitry is disabled.

21. The computer-implemented method of claim 20, comprising enabling a third low power state when the analog front end circuitry is power gated.

* * * * *